United States Patent
Shurish et al.

(10) Patent No.: US 11,495,880 B2
(45) Date of Patent: Nov. 8, 2022

(54) STEPPED RADAR COVER AND METHOD OF MANUFACTURE

(71) Applicant: SRG GLOBAL, LLC, Troy, MI (US)

(72) Inventors: James M Shurish, Troy, MI (US); Nicholas Bruyneel, Troy, MI (US)

(73) Assignee: SRG GLOBAL, LLC, Troy, MI (US)

( * ) Notice: Subject to any disclaimer, the term of this patent is extended or adjusted under 35 U.S.C. 154(b) by 185 days.

(21) Appl. No.: 16/851,464

(22) Filed: Apr. 17, 2020

(65) Prior Publication Data

US 2020/0335864 A1    Oct. 22, 2020

Related U.S. Application Data

(60) Provisional application No. 62/835,934, filed on Apr. 18, 2019.

(51) Int. Cl.
*H01Q 1/42* (2006.01)
*G01S 13/931* (2020.01)
*G01S 7/02* (2006.01)

(52) U.S. Cl.
CPC ........... *H01Q 1/421* (2013.01); *G01S 13/931* (2013.01); *G01S 7/02* (2013.01); *G01S 7/027* (2021.05); *G01S 2013/93271* (2020.01)

(58) Field of Classification Search
CPC ...... H01Q 1/421; H01Q 1/3233; H01Q 1/422; H01Q 1/42; H01Q 15/08; G01S 13/931; G01S 7/02; G01S 7/027; G01S 2013/93271; G01S 7/03
See application file for complete search history.

(56) References Cited

U.S. PATENT DOCUMENTS

| | | | |
|---|---|---|---|
| 3,314,070 A | 4/1967 | Youngren | |
| 3,422,057 A | 1/1969 | Schmidt | |
| 4,896,164 A | 1/1990 | Burke et al. | |
| 6,107,976 A * | 8/2000 | Purinton | H01Q 1/42 343/872 |
| 6,184,842 B1 | 2/2001 | Leinweber et al. | |
| 7,295,166 B2 | 11/2007 | Fujii et al. | |
| 7,355,560 B2 * | 4/2008 | Nagai | H01Q 15/08 343/911 R |
| 7,463,212 B1 | 12/2008 | Ziolkowski | |
| 7,741,991 B1 | 6/2010 | Macbean | |
| 8,081,137 B2 | 12/2011 | Chang et al. | |
| 8,633,865 B2 | 1/2014 | Miyagawa et al. | |

(Continued)

FOREIGN PATENT DOCUMENTS

| | | |
|---|---|---|
| CN | 101223457 A | 7/2008 |
| CN | 101271999 A | 9/2008 |

(Continued)

OTHER PUBLICATIONS

International Search report and written opinion received for PCT application No. PCT/IB2020/053676, dated Jun. 23, 2020, 9 pages.

(Continued)

*Primary Examiner* — Bernarr E Gregory (57) ABSTRACT

Two-piece and three-piece radomes and their methods of manufacture involve independently optimizing a thickness profile of each piece to achieve desired radar performance metrics such that an air gap can exist or can be intentionally included between the various pieces without negatively affecting the radar performance of the radomes.

20 Claims, 5 Drawing Sheets

(56) References Cited

U.S. PATENT DOCUMENTS

| | | | |
|---|---|---|---|
| 8,917,220 B2 | 12/2014 | Ziolkowski et al. |
| 8,974,712 B2 | 3/2015 | Ohtake et al. |
| 9,099,782 B2 | 8/2015 | Ziolkowski |
| 9,876,279 B2 | 1/2018 | Crouch et al. |
| 10,062,962 B2 | 8/2018 | Kolak et al. |
| 10,153,546 B2 | 12/2018 | Kolak et al. |
| 2005/0168374 A1 | 8/2005 | Kamiya et al. |
| 2007/0109206 A1 | 5/2007 | Fujii et al. |
| 2008/0136731 A1 | 6/2008 | Wu et al. |
| 2008/0165075 A1 | 7/2008 | Adair et al. |
| 2008/0233367 A1 | 9/2008 | Maeda et al. |
| 2008/0309579 A1* | 12/2008 | Maeda | H01Q 1/3233 343/872 |
| 2009/0091509 A1 | 4/2009 | Chang et al. |
| 2010/0028610 A1 | 2/2010 | Fujii et al. |
| 2010/0039346 A1 | 2/2010 | Peter et al. |
| 2010/0265158 A1 | 10/2010 | Bowers et al. |
| 2010/0295749 A1 | 11/2010 | Vanliere et al. |
| 2011/0273356 A1 | 11/2011 | Kawaguchi et al. |
| 2012/0212391 A1 | 8/2012 | Dazet |
| 2013/0002514 A1 | 1/2013 | Ziolkowski et al. |
| 2014/0078016 A1 | 3/2014 | Corodova et al. |
| 2014/0091969 A1 | 4/2014 | Shi et al. |
| 2014/0218263 A1 | 8/2014 | Burdenski et al. |
| 2014/0266924 A1 | 9/2014 | Hwang et al. |
| 2015/0086731 A1 | 3/2015 | Sugiura et al. |
| 2015/0140259 A1* | 5/2015 | Sugiura | G01S 7/03 428/161 |
| 2016/0111776 A1 | 4/2016 | Okumura et al. |
| 2016/0204505 A1 | 7/2016 | Mao et al. |
| 2017/0057424 A1 | 3/2017 | Yamada et al. |
| 2017/0168137 A1 | 6/2017 | Cho et al. |
| 2017/0301982 A1 | 10/2017 | Ohtake et al. |
| 2017/0324157 A1 | 11/2017 | Shurish et al. |
| 2017/0352950 A1 | 12/2017 | Sakurai et al. |
| 2018/0013196 A1 | 1/2018 | Sakurai et al. |
| 2018/0090831 A1 | 3/2018 | Frayer et al. |
| 2018/0207900 A1 | 7/2018 | Kosugi |
| 2018/0287252 A1 | 10/2018 | Nicke et al. |
| 2018/0291496 A1 | 10/2018 | Kim |

FOREIGN PATENT DOCUMENTS

| | | |
|---|---|---|
| CN | 202550071 U | 11/2012 |
| CN | 204905441 U | 12/2015 |
| DE | 102008027725 A1 | 12/2008 |
| EP | 2383364 A1 | 11/2011 |
| JP | 2009198192 A | 9/2009 |
| JP | 2011046183 A | 3/2011 |
| WO | 0062371 A2 | 10/2000 |
| WO | 2009045252 A1 | 4/2009 |
| WO | 2010135659 A1 | 11/2010 |
| WO | 2013003453 A2 | 1/2013 |
| WO | 2013037811 A1 | 3/2013 |
| WO | 2016104561 A1 | 6/2016 |
| WO | 2016104575 A1 | 6/2016 |
| WO | 2018/102167 A1 | 6/2018 |

OTHER PUBLICATIONS

International Search Report and Written Opinion received for PCT Application No. PCT/US2017/062485, dated Feb. 21, 2018, 14 Pages.

Notice of Allowance received for CN Application No. 201780071998.6, dated Aug. 19, 2021, 07 Pages (03 pages of English Translation and 04 Pages of Official notification).

Office action and Search Report received for Chinese Application No. 201780071998.6, dated Sep. 3, 2020, 24 pages (13 pages of English Translation and 11 pages of official notification).

Xia Han, et al, "Research on Metamaterial Radome with Inhomogenous Structure", Journal of Henan Normal University (Natural Science Edition), vol. 43(.2), pp. 1-6 (2015).(Abstract).

* cited by examiner

STEPPED RADAR COVER AND METHOD OF MANUFACTURE

CROSS-REFERENCE TO RELATED APPLICATIONS

The present application claims the benefit of U.S. Provisional Application No. 62/835,934, filed on Apr. 18, 2019. The disclosure of the above-identified application is incorporated herein by reference in its entirety.

FIELD

The present application relates to radar covers and, more particularly, to a stepped radar cover and its method of manufacture.

BACKGROUND

A radar cover or radome is a device that protects a radar transceiver. Ideally, the radome should be radar transparent so as to not negatively affect the performance of the radar transceiver. To achieve an aesthetic design, a radome may have multiple layers (e.g., multiple pieces). Air gaps between multi-layer or multi-piece radomes often occur, which attenuates radar waves transmitted therethrough and thus negatively affects performance. Eliminating these air gaps requires very high precision manufacturing techniques, which increases costs. Accordingly, while conventional multi-layer or multi-piece radomes work well for their intended purpose, there remains a need for improvement in the relevant art.

SUMMARY

According to one aspect of the present disclosure, a two-piece radome is presented. In one exemplary implementation, the two-piece radome comprises: a back piece formed by injection molding a first radar-transparent resin and defining a first stepped feature and a first thickness profile that is independently optimized to achieve desired radar performance metrics, and a cover piece formed by injection molding a second radar-transparent resin and defining a second stepped feature that is complimentary to the first stepped feature and a second thickness profile that is independently optimized to achieve the desired radar performance metrics, wherein an air gap is present between the back piece and the cover piece.

In some implementations, the first and second thickness profiles are independently optimized to achieve minimal radar attenuation. In some implementations, the first radar-transparent resin is acrylonitrile styrene acrylate (ASA) or polycarbonate (PC) and the second radar-transparent resin is PC. In some implementations, the back piece is opaque and the cover piece is transparent or translucent. In some implementations, the first stepped feature is part of a logo, an emblem, or a grille feature of a vehicle.

According to another aspect of the present disclosure, a three-piece radome is presented. In one exemplary implementations, the three-piece radome comprises: a back piece formed by injection molding a first radar-transparent resin and defining a first thickness profile that is substantially uniform, an intermediary piece formed by injection molding a second radar-transparent resin and defining a first stepped feature and a second thickness profile that is independently optimized to achieve desired radar performance metrics, and a cover piece formed by injection molding a third radar-transparent resin and defining a second stepped feature that is complimentary to the first stepped feature and a third thickness profile that is independently optimized to achieve the desired radar performance metrics, wherein air gaps are present between the back piece, the intermediary piece, and the cover piece.

In some implementations, the second and third thickness profiles are independently optimized to achieve minimal radar attenuation. In some implementations, the first and second radar-transparent resins are each one of ASA and PC and the third radar-transparent resin is PC. In some implementations, the back piece is opaque, the intermediary piece is opaque or transparent or translucent, and the cover piece is transparent or translucent. In some implementations, the first stepped feature is part of a logo, an emblem, or a grille feature of a vehicle.

According to another aspect of the present disclosure, a method of manufacturing a two-piece radome is presented. In one exemplary implementation, the method comprises: determining a first thickness profile for a back piece of the radome that is independently optimized to achieve desired radar performance metrics, the back piece defining a first stepped feature, determining a second thickness profile for a cover piece of the radome that is independently optimized to achieve desired radar performance metrics, the cover piece defining a second stepped feature that is complimentary to the first stepped feature, injection molding first and second radar-transparent resins to form the back piece and the cover piece, respectively, and combining the back piece and the cover piece to form the radome, wherein an air gap is present between the back piece and the cover piece.

In some implementations, the first and second radar-transparent resins are injection molded and combined via two shots of a multi-shot injection molding process. In some implementations, the first and second thickness profiles are independently optimized to achieve minimal radar attenuation. In some implementations, the first radar-transparent resin is ASA or PC and the second radar-transparent resin is PC. In some implementations, the back piece is opaque and the cover piece is transparent or translucent. In some implementations, the first stepped feature is part of a logo, an emblem, or a grille feature of a vehicle.

According to another aspect of the present disclosure, a method of manufacturing a three-piece radome is presented. In one exemplary implementation, the method comprises: determining a first thickness profile for a back piece of the radome that is substantially uniform, determining a second thickness profile for an intermediary piece of the radome that is independently optimized to achieve desired radar performance metrics, the intermediary piece defining a first stepped feature, determining a third thickness profile for a cover piece of the radome that is independently optimized to achieve the desired radar performance metrics, the cover piece defining a second stepped feature that is complimentary to the first stepped feature, injection molding first, second, and third radar-transparent resins to form the back piece, the intermediary piece, and the cover piece, respectively, and combining the back piece, the intermediary piece, and the cover piece to form the radome, wherein air gaps are present between the back piece, the intermediary piece, and the cover piece.

In some implementations, the first, second, and third radar-transparent resins are injection molded and combined via three shots of a multi-shot injection molding process. In some implementations, the second and third thickness profiles are independently optimized to achieve minimal radar attenuation. In some implementations, the first and second radar-transparent resins are each one of ASA and PC and the third radar-transparent resin is PC. In some implementations, the back piece is opaque, the intermediary piece is opaque or transparent or translucent, and the cover piece is transparent or translucent. In some implementations, the first stepped feature is part of a logo, an emblem, or a grille feature of a vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the substance of the present disclosure are intended to be within the scope of the present disclosure.

DETAILED DESCRIPTION

As discussed above, conventional multi-layer or multi-piece radomes require very high precision manufacturing processes to avoid air gaps that could increase radar attenuation and thus decrease radar performance. Accordingly, improved multi-layer or multi-piece radomes and their methods of manufacture are presented. Each piece of these multi-piece radomes has a thickness profile that is independently designed or optimized to achieve desired radar performance metrics (i.e., minimal radar attenuation/loss or reflection). Then, once the multiple pieces are stacked together to form the radome, the radome will be able to achieve optimal radar performance no matter the presence or size of the air gap(s) therebetween. In addition to the performance benefits, these improved multi-piece radomes can be manufactured without the very high precision manufacturing processes required by conventional multi-piece radomes. The ability to include an air gap may also enhance visual aesthetics. While a two-piece radome configuration may provide for decreased costs and/or easier manufacturing, a three-piece radome configuration may also provide various benefits (e.g., more design flexibility).

Figure 1A:
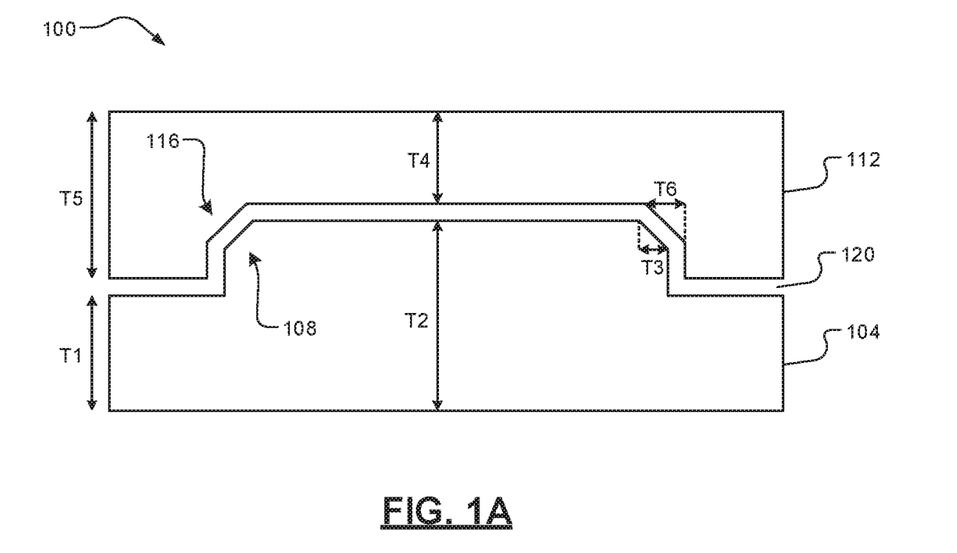
FIGS. 1A-1B are cross-sectional diagrams of example multi-piece stepped radomes according to some implementations of the present disclosure.

Referring now to FIG. 1A, an example embodiment of a two-piece radome 100 according to the present disclosure is illustrated. The radome 100 comprises a back piece 104 defining a stepped feature 108. This stepped feature 108, for example, could be part of a logo, emblem, grille feature, or any three-dimensional design effect of a vehicle. The thickness profile of the back piece 104 ranges from a first thickness T1 to a second thickness T2 at the stepped feature 108. The thickness profile of the back piece 104 is independently optimized to achieve desired radar performance metrics (loss, reflection, etc.). The back piece 104 could be formed by injection molding (e.g., in a shot of a multi-shot injection molding process) a suitable radar-transparent resin, such as acrylonitrile styrene acrylate (ASA) or polycarbonate (PC). In one exemplary implementation, the back piece 104 is opaque, but it will be appreciated that the back piece 104 could be transparent or translucent. It will also be appreciated that radar-transparent coatings could be applied to a top surface of the back piece 104, such as a radar-transparent metalloid.

The radome 100 further comprises a cover piece 112 defining a stepped feature 116 that is complimentary to the stepped feature 108 of the back piece 104 and an air gap 120 therebetween the pieces 104, 112. The thickness profile of the cover piece 112 ranges from a fourth thickness T4 at the stepped feature 116 to a fifth thickness T5. The thickness profile of the cover piece 112 is also optimized to achieve desired radar performance metrics. This optimization, however, is separate or independent of the optimization of the thickness profile of the back piece 104. In other words, both the back piece 104 and the cover piece 112 are independently optimized to achieve desired radar performance metrics. The cover piece 112 could also be formed by injection molding (e.g., in another shot of the multi-shot injection molding process) a suitable radar-transparent and transparent or translucent resin, such as PC. The cover piece 112 is transparent or translucent such that the stepped feature 108 is visible. It will also be appreciated that the cover piece 112 could be formed of an opaque resin and/or that radar-transparent coatings could be applied to a bottom surface of the cover piece 112, such as a radar-transparent metalloid.

In one exemplary implementation, the thicknesses T1, T2, T4, and T5 are optimizes according to the following equation:

$$d = \frac{m \times \lambda}{2 \times n \times \cos(\theta)},$$

where d is the thickness, n is the refractive index of the material, $\Theta$ is the angle of incidence, m is an integer, and $\lambda$ is the wavelength of the radar. When thicknesses T1, T2, T4, and T5 are optimized according to the above, the air gap 120 will not affect reflection. If thicknesses T3 and, more importantly, T6 are too large, however, the individual thicknesses in these areas will not follow the above, which is why thickness T6 should be as small as possible.

Figure 1B:
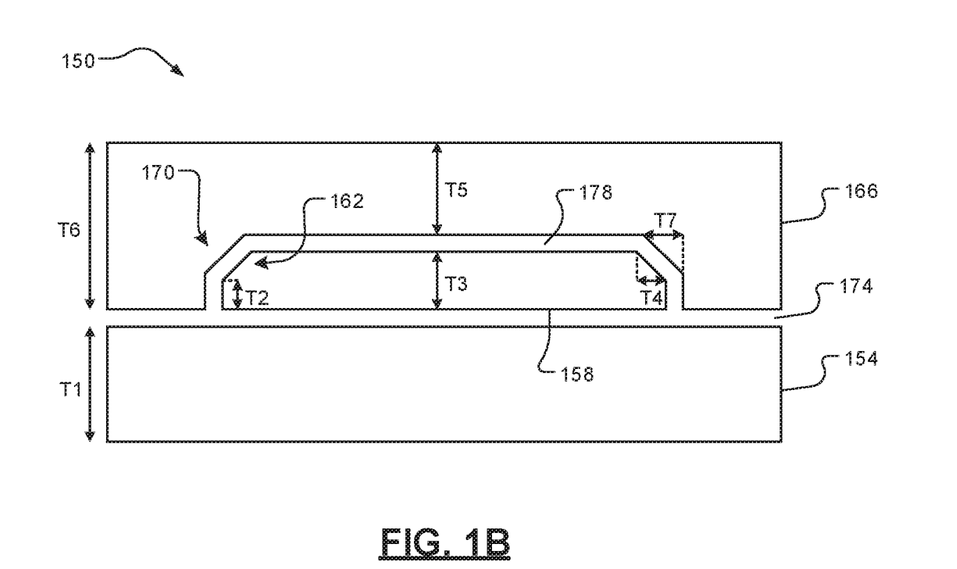

Referring now to FIG. 1B, an example embodiment of a three-piece radome 150 according to the present disclosure is illustrated. The radome 150 comprises a back piece 154 defining a substantially uniform thickness T1. The back piece 154 could be formed by injection molding (e.g., in a shot of a multi-shot injection molding process) a suitable radar-transparent resin, such as ASA or PC. In one exemplary implementation, the back piece 154 is opaque, but it will be appreciated that the back piece 154 could be transparent or translucent. It will also be appreciated that radar-transparent coatings could be applied to a top surface of the back piece 154, such as a radar-transparent metalloid. The radome 150 further comprises an intermediary piece 158 defining a stepped feature 162 and an air gap 174 therebetween the pieces 154, 158. This stepped feature 162, for example, could be part of a logo or emblem of a vehicle. The thickness profile of the intermediary piece 158 ranges from a second thickness T2 to a third thickness T3 at the stepped feature 162. The thickness profile of the intermediary piece 158 is independently optimized to achieve desired radar performance metrics. The intermediary piece 158 could be formed by injection molding (e.g., in another shot of the multi-shot injection molding process) a suitable radar-transparent resin, such as PC.

In one exemplary implementation, the intermediary piece 158 is opaque, but it will be appreciated that the intermediary piece 158 could be transparent or translucent. It will also be appreciated that radar-transparent coatings could be applied to a top and/or bottom surface of the intermediary piece 158, such as a radar-transparent metalloid. The radome 150 further comprises a cover piece 166 defining a stepped feature 170 that is complimentary to the stepped feature 162 of the intermediary piece 158 and an air gap 178 therebetween the pieces 158, 166. The thickness profile of the cover piece 166 ranges from a fifth thickness T5 at the stepped feature 170 to a sixth thickness T6. The thickness profile of the cover piece 166 is optimized separately and independently from the thickness profile of the intermediary piece 158 to achieve desired radar performance metrics. The cover piece 166 could also be formed by injection molding (e.g., in another shot of the multi-shot injection molding process) a suitable radar-transparent and transparent or translucent resin, such as PC. The cover piece 166 is transparent or translucent such that the stepped feature 162 is visible. It will also be appreciated that radar-transparent coatings could be applied to a bottom surface of the cover piece 166, such as a radar-transparent metalloid.

Figure 2A:
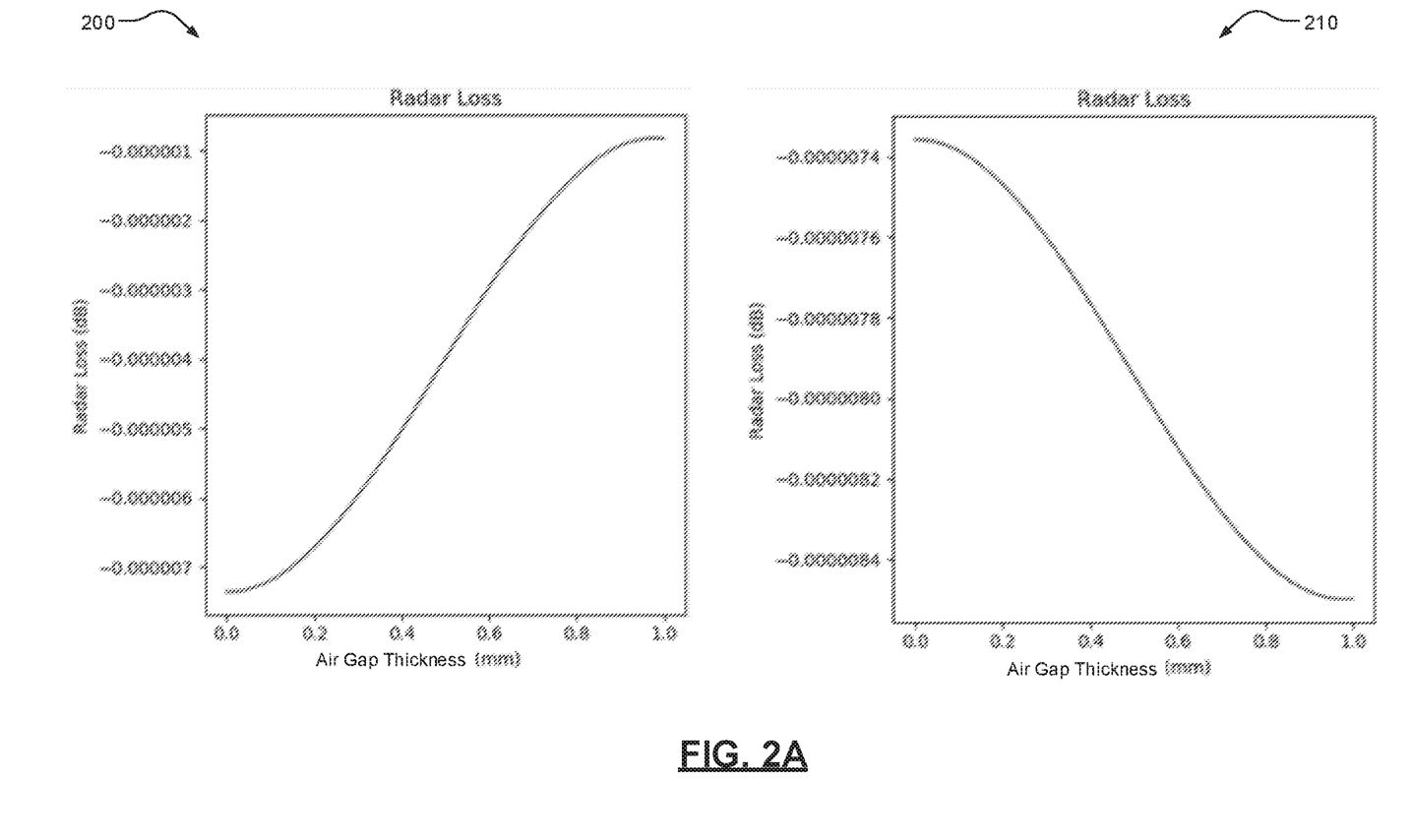
FIGS. 2A-2B are plots of example performance data for non-optimized and optimized two-piece stepped radomes having air gaps according to some implementations of the present disclosure.
Figure 2B:
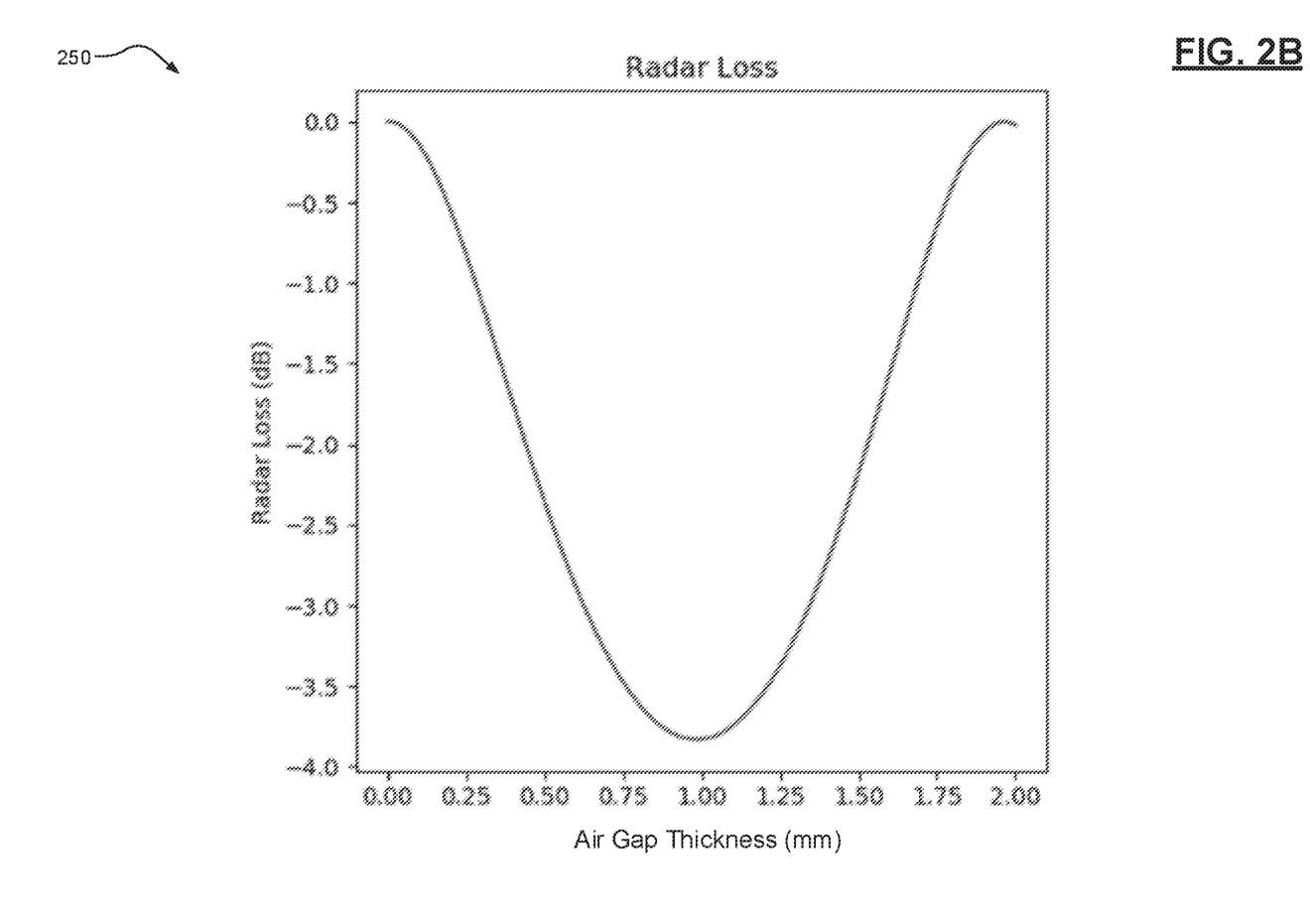

Referring now to FIGS. 2A-2B and with continued reference to FIG. 1A, plots 200, 210 of example radar performance of an example optimized two-piece radome having an air gap according to the present disclosure is illustrated. The thickness profile of the back piece 104 ranges from 2.365 millimeters (mm) (T1) to 3.548 mm (T2) and the thickness profile of the cover piece 112 ranges from 3.547 mm (T4) to 4.730 mm (T5). Plot 200 (left) illustrates radar attenuation or loss for various thicknesses of the air gap 120 in the regions where the back piece is 2.365 mm thick (T1) and the cover piece 112 is 4.730 mm thick (T5). Plot 210 (right) illustrates radar attenuation or loss for various widths of the air gap 120 in the regions where the back piece 104 is 3.548 mm thick (T2) and the cover piece 112 is 3.547 mm thick (T4). As can be seen, a substantial thickness for the air gap 120 could be selected without substantially affecting radar performance. For example, an air gap of 0.4 mm could be selected as a balance between the radar performance of plots 200, 210. It will be appreciated, however, that the above thicknesses and the illustrated radar performance metrics are merely example data for purposes of this disclosure and that any optimized thickness profiles could be determined and utilized.

In contrast to the optimized design corresponding to FIG. 2A, a plot 250 of an example radar performance for a non-optimized two-piece radome having a varying air gap is illustrated in FIG. 2B. In this example, the cover piece 112 is 5.322 mm thick and the back piece 104 is 2.950 mm thick. As can be seen in FIG. 2B, there is relatively low radar loss when the air gap is thin (e.g., less than 0.25 mm) but the radar loss increases dramatically as the air gap thickness increases (e.g., almost a−4.0 decibel (dB) loss at a thickness of approximately 1.00 mm. Due to variations in manufacturing, the thickness of the air gap could become a problem and thus needs to be rigorously controlled, which increases costs and complexity.

Figure 3A:
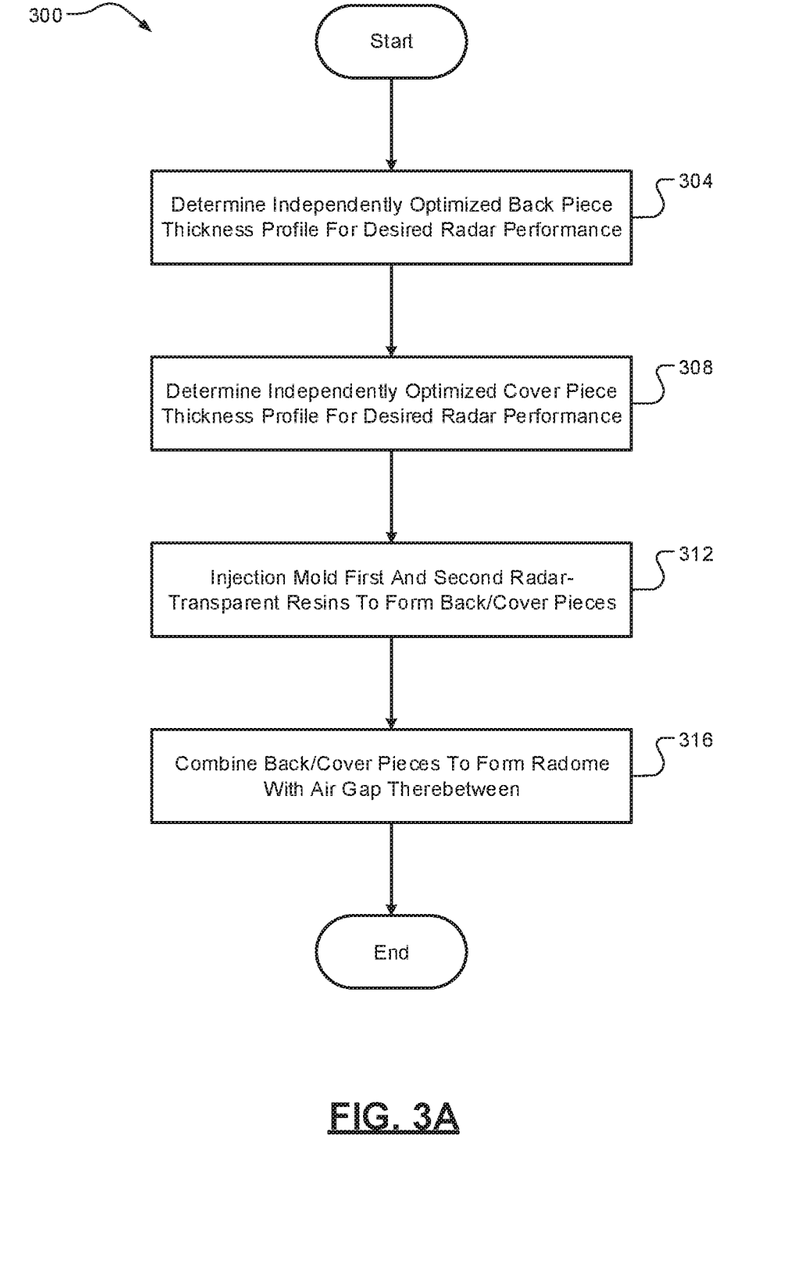
FIGS. 3A-3B are flow diagrams of example methods of manufacturing multi-piece stepped radomes according to some implementations of the present disclosure.

Referring now to FIG. 3A, a flow diagram of an example method 300 of manufacturing a two-piece radome is illustrated. While radome 100 of FIG. 1A is specifically referenced herein, it will be appreciated that this method 300 could be utilized to form other two-piece radomes. At 304, a first thickness profile for the back piece 104 is determined for minimal radar attenuation, with the back piece 104 defining the first stepped feature 108. At 308, a second thickness profile for the cover piece 112 is determined for minimal radar attenuation, with the cover piece 112 defining the complimentary second stepped feature 116. At 312, first and second radar-transparent resins are injection molded to form the back piece 104 and the cover piece 112, respectively. At 316, the back piece 104 and the cover piece 112 are combined to form the radome 100 with an air gap 120 being present between the back piece 104 and the cover piece 112. In one exemplary implementation, steps 312 and 316 are a multi-shot injection molding process.

Figure 3B:
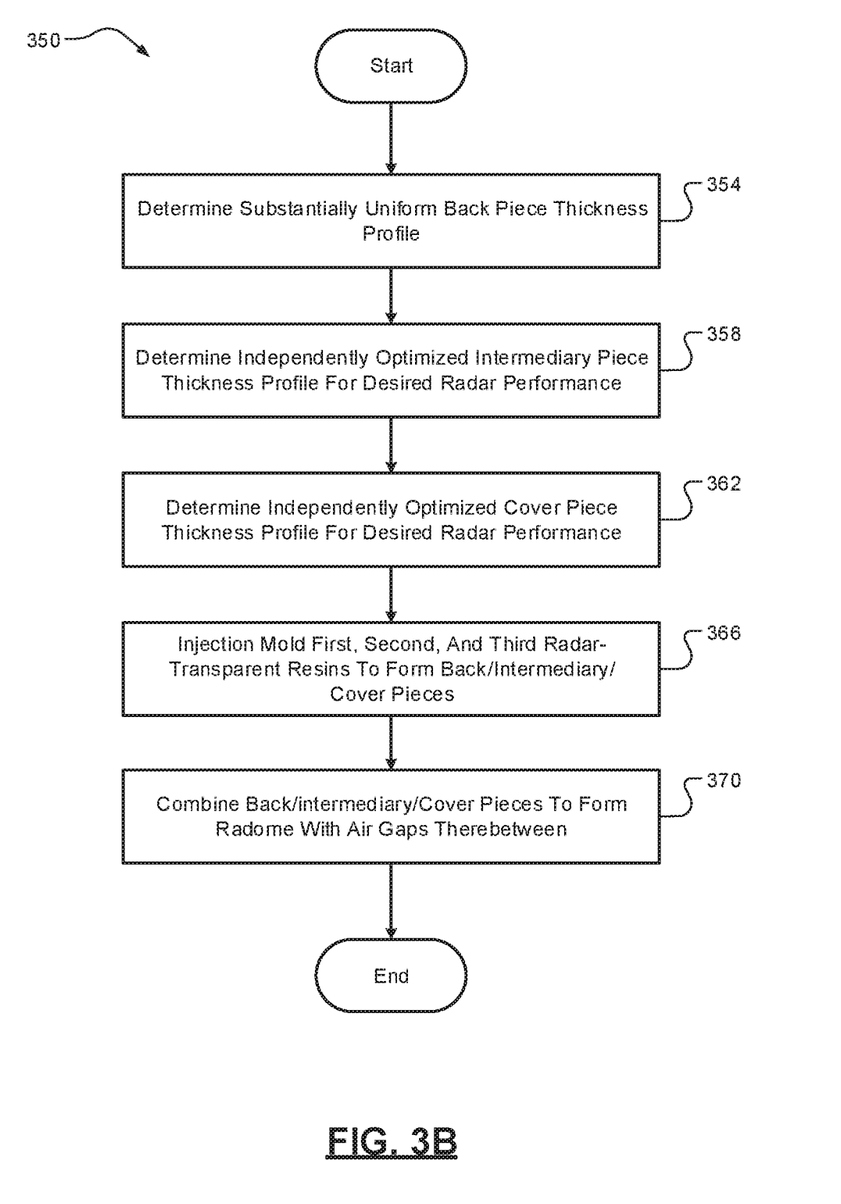

Referring now to FIG. 3B, a flow diagram of an example method 350 of manufacturing a three-piece radome is illustrated. While radome 150 of FIG. 1B is specifically referenced herein, it will be appreciated that this method 350 could be utilized to form other three-piece radomes. At 354, a first thickness profile for the back piece 154 is determined that is substantially uniform. At 358, a second thickness profile for the intermediary piece 158 is determined, with the intermediary piece 158 defining the first stepped feature 162. At 362, a third thickness profile for the cover piece 166 is determined for minimal radar attenuation, with the cover piece 166 defining the complimentary second stepped feature 170. At 366, first, second, and third radar-transparent resins are injection molded to form the back piece 154, the intermediary piece 158, and the cover piece 166, respectively. At 370, the back piece 154, the intermediary piece 158, and the cover piece 166 are combined to form the radome 150 with air gaps 174, 178 being present between the back piece 154, the intermediary piece 158, and the cover piece 166. In one exemplary implementation, steps 366 and 370 are a multi-shot injection molding process.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A two-piece radome, comprising:
   a back piece formed by injection molding a first radar-transparent resin and defining a first stepped feature and a first thickness profile that is optimized to achieve a first set of desired radar performance metrics; and
   a cover piece formed by injection molding a second radar-transparent resin and defining a second stepped feature that is complimentary to the first stepped feature and a second thickness profile that is optimized independently or separately from the optimization of the first thickness profile to achieve a second set of desired radar performance metrics,
   wherein an air gap is present between the back piece and the cover piece and the first and second thickness profiles are each independently optimized to achieve the respective first and second sets of desired radar performance metrics such that the radome has optimal radar performance no matter the presence or size of the air gap.

2. The radome of claim 1, wherein the first and second thickness profiles are independently optimized to achieve minimal radar attenuation.

3. The radome of claim 1, wherein the first radar-transparent resin is acrylonitrile styrene acrylate (ASA) or polycarbonate (PC) and the second radar-transparent resin is PC.

4. The radome of claim 1, wherein the back piece is opaque and the cover piece is transparent or translucent.

5. The radome of claim 1, wherein the first stepped feature is part of a logo, an emblem, or a grille feature of a vehicle.

6. A three-piece radome, comprising:
   a back piece formed by injection molding a first radar-transparent resin and defining a first thickness profile that is substantially uniform;
   an intermediary piece formed by injection molding a second radar-transparent resin and defining a first stepped feature and a second thickness profile that is optimized to achieve a first set of desired radar performance metrics; and
   a cover piece formed by injection molding a third radar-transparent resin and defining a second stepped feature that is complementary to the first stepped feature and a third thickness profile that is optimized independently or separately from the optimization of the first thickness profile to achieve a second set of desired radar performance metrics,
   wherein air gaps are present between the back piece, the intermediary piece, and the cover piece and the second and third thickness profiles are each independently optimized to achieve the respective first and second sets of desired radar performance metrics such that the radome has optimal radar performance no matter the presence or size of the air gaps.

7. The radome of claim 6, wherein the second and third thickness profiles are independently optimized to achieve minimal radar attenuation.

8. The radome of claim 6, wherein the first and second radar-transparent resins are each one of acrylonitrile styrene acrylate (ASA) and polycarbonate (PC) and the third radar-transparent resin is PC.

9. The radome of claim 6, wherein the back piece is opaque, the intermediary piece is opaque or transparent or translucent, and the cover piece is transparent or translucent.

10. The radome of claim 6, wherein the first stepped feature is part of a logo, an emblem, or a grille feature of a vehicle.

11. A method of manufacturing a three-piece radome, the method comprising:
    determining a first thickness profile for a back piece of the radome, wherein the first thickness profile is substantially uniform;
    independently or separately optimizing, without regard for the first thickness profile or an optimized third thickness profile of a cover piece of the radome, an optimized second thickness profile for an intermediary piece of the radome to achieve a first set of desired radar performance metrics;
    independently or separately optimizing, without regard for the first or optimized second thickness profiles, the optimized third thickness profile of the cover piece to achieve a second set of desired radar performance metrics;
    injection molding first, second, and third radar-transparent resins to form the back piece and the cover piece, respectively, wherein the intermediary piece defines a first stepped feature and the cover piece defines a second stepped feature that is complementary to the first stepped feature; and
    combining the back piece, the intermediary piece, and the cover piece to form the radome, wherein air gaps are present between the back piece, the intermediary piece, and the cover piece.

12. The method of claim 11, wherein the second and third thickness profiles are independently optimized to achieve minimal radar attenuation.

13. The method of claim 11, wherein the injection molding and the combining further comprises injection molding, by a first shot of a multi-shot injection molding process, the first radar-transparent resin to form the back piece.

14. The method of claim 13, wherein the injection molding and the combining further comprises injection molding, by a second shot of the multi-shot injection molding process, the second radar-transparent resin to form the intermediary piece.

15. The method of claim 14, wherein the first and second radar-transparent resins are each one of acrylonitrile styrene acrylate (ASA) and polycarbonate (PC).

16. The method of claim 14, wherein the injection molding and the combining further comprises injection molding, by a third shot of the multi-shot injection molding process, the third radar-transparent resin to form the cover piece.

17. The method of claim 16, wherein the first and second radar transparent resins are each one of acrylonitrile styrene acrylate (ASA) and polycarbonate (PC) and the third radar-transparent resin is PC.

18. The method of claim 11, wherein the back piece is opaque, the intermediary piece is opaque or transparent or translucent, and the cover piece is transparent or translucent.

19. The method of claim 11, wherein the back piece is opaque and the cover piece is transparent or translucent.

20. The method of claim 11, wherein the first stepped feature is part of a logo, an emblem, or a grille feature of a vehicle.

\* \* \* \* \*